United States Patent
Scholl

(10) Patent No.: US 11,115,309 B1
(45) Date of Patent: Sep. 7, 2021

(54) EXTERNAL NETWORK ROUTE ADVERTISEMENT VALIDATION

(71) Applicant: Amazon Technologies, Inc., Seattle, WA (US)

(72) Inventor: Thomas Bradley Scholl, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 112 days.

(21) Appl. No.: 16/430,291

(22) Filed: Jun. 3, 2019

(51) Int. Cl.
  *H04L 12/26* (2006.01)
  *H04L 12/741* (2013.01)

(52) U.S. Cl.
  CPC .............. *H04L 43/12* (2013.01); *H04L 45/74* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 10,038,601 | B1 * | 7/2018 | Becker | H04L 41/28 |
| 10,462,037 | B1 * | 10/2019 | Ramabadran | H04L 43/50 |
| 2003/0204619 | A1 * | 10/2003 | Bays | H04L 43/10 |
| | | | | 709/238 |
| 2006/0195607 | A1 * | 8/2006 | Naseh | H04L 67/1008 |
| | | | | 709/238 |
| 2011/0032833 | A1 * | 2/2011 | Zhang | H04L 45/70 |
| | | | | 370/252 |
| 2012/0155319 | A1 * | 6/2012 | Gerber | H04L 61/1511 |
| | | | | 370/254 |
| 2016/0373405 | A1 * | 12/2016 | Miller | H04L 63/0263 |
| 2019/0327312 | A1 * | 10/2019 | Gupta | H04L 63/0272 |

\* cited by examiner

*Primary Examiner* — Xavier S Wong
(74) *Attorney, Agent, or Firm* — Klarquist Sparkman, LLP

(57) ABSTRACT

Probe packets are transmitted from a source network to an external network to validate that the external network is accepting network prefix announcements to be loaded into forwarding tables of routers of the external network to ensure network connectivity. The network prefix announcements can be Border Gateway Protocol (BGP) announcements transmitted from the source network to the external network during a BGP peering session. After announcing a network prefix announcement, the source network can transmit a probe packet having a destination address in a range associated with the announced network prefix to the external network. An edge router of the source network can monitor incoming packets using an ingress Access Control List (ACL) to detect whether the probe packet returns, and if so, validate that the network prefix announcement was successful. If the probe packet does not return, an alert can be generated and/or remedial actions can be taken.

20 Claims, 11 Drawing Sheets

EXTERNAL NETWORK ROUTE ADVERTISEMENT VALIDATION

BACKGROUND

Border Gateway Protocol (BGP) is a networking protocol that can be used to manage how packets are routed across networks through the exchange of routing and reachability information between edge routers. BGP is often used to direct packets between autonomous systems, where an autonomous system refers to a network managed by a single enterprise or service provider. For example, external BGP (eBGP) peering sessions can be established between autonomous systems, during which edge routers of the autonomous system exchange information with one another. The exchanged information can include announcements of public network prefixes (e.g., Internet Protocol (IP) prefixes) and associated ranges of addresses.

When a given autonomous system ("source network") announces a new network prefix to another autonomous system ("external network") during an eBGP peering session, the expectation is that the external network will accept the announcement and update its routing tables. This will cause future network traffic destined for network addresses with the announced prefix to be forwarded by the external network towards the source network. However, in some circumstances, an external network will fail to accept a routing announcement, which can lead to suboptimal routing (e.g., routing with higher latency) and user complaints. This can occur when the external networks fails to update the prefix-list filters on their network infrastructure, for reasons such as the external network failing to ingest Internal Routing Registry (IRR) records (e.g., Routing Assets Database (RADB) entries), a lack of IRR records published by the source network (the source network's error), a failure of the external network to update their routing filters, or the external network relying upon non-standard mechanisms (e.g., email) to update filters.

There is currently no reliable mechanism for determining if an external network has accepted a source network's prefix announcements. For example, in the context of the BGP protocol, network operators often rely upon public BGP Looking Glass sites (if available) to obtain a view into an external network, to understand if the announced routes were accepted. Even in situations where a BGP Looking Glass site is available, it may not provide sufficient visibility on the per-router or per-BGP-session level for the source network to understand if the prefixes were accepted. Other existing techniques for determining if an external network has accepted a source network's prefix announcements include examining the source network's netflow data to understand if traffic is ingressing the external network connectivity of the source network, to understand if traffic is being forwarding into the source network against an announced prefix. However, this technique assumes that the source network is receiving some sort of traffic for an announced prefix, which may not be true in all circumstances. Thus, there exists a need for a mechanism that can reliably validate the acceptance of network prefix announcements by external networks.

DETAILED DESCRIPTION

Figure 1:
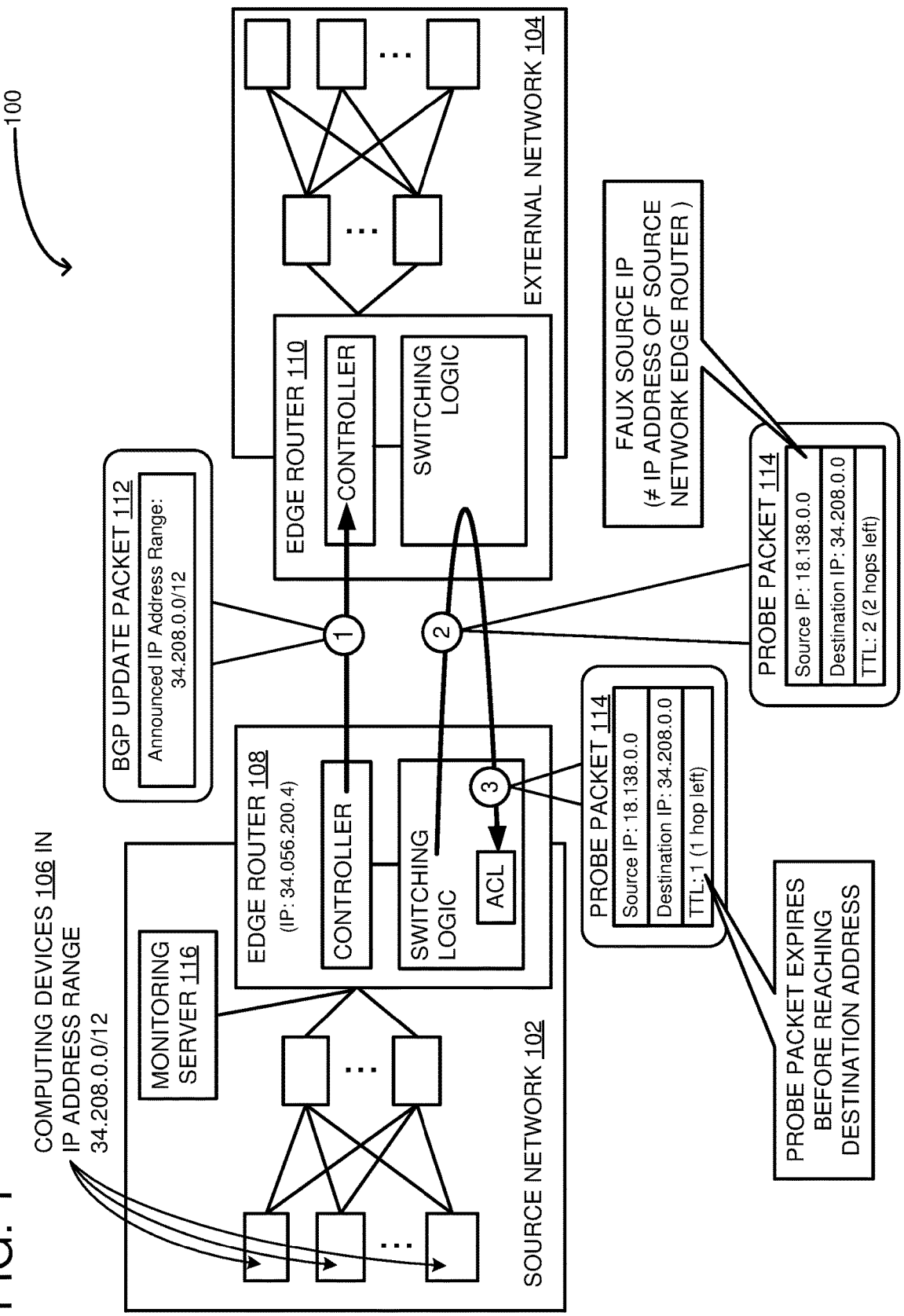
FIG. 1 is a diagram of a source network and an adjacent external network, wherein probe packets are sent from the source network to the external network to validate announcements of network prefixes, in accordance with one embodiment.

In one embodiment, after announcing a network prefix to an external network, a source network can generate a probe packet having a destination address field with a value in a range associated with the announced network prefix, and transmit the probe packet towards an external network, such as a transit or peer network. The probe packet can be an IP-based probe packet, or a packet based on another protocol such as Transmission Control Protocol (TCP) or User Datagram Protocol (UDP). In addition to the destination field, the probe packet can also include a source address field indicating an actual or faux source address from which the probe packet was sent and a time-to-live (TTL) field having a value that causes the probe packet to expire before reaching the destination IP address, among other fields. After transmitting the probe packet, the source network can monitor incoming packets, e.g., at an ingress packet filter of an edge router of the source network, to detect whether the probe packet returns. The ingress packet filter can be an ingress Access Control List (ACL) including a plurality of interfaces and per-interface counters (e.g., one counter per interface). The monitoring can include, for a given incoming packet, comparing values of one or more specified fields of the probe packet to one or more corresponding fields of the incoming packet, and detecting that the probe packet has returned to the edge router if the values match. For example, responsive to the values matching, one or more counters of the packet filter can be incremented, which can serve as an indication that the probe packet has returned. If it is determined that the probe packet has returned to the source network, the network prefix announcement can be validated (e.g., verified as successful). Otherwise, if the probe packet does not return, a failure of the network prefix announcement can be indicated, and appropriate remedial actions can be taken.

As an example, a source network can generate an IP-based probe packet including a destination address field with a value of 34.208.0.0, which is an address in a range associated with a previously-announced IP prefix 34.208. The probe packet can further include a source address field with a value of 18.138.0.0, and a TTL field having a low value such as two or three (e.g., two or three hops). In this example, the source address can be an internal address of the source network which is dedicated for testing purposes and not allocated to any user. After the probe packet is transmitted by an edge router of the source network to an external network, the ingress ACL of the edge router can monitor incoming packets (e.g., by comparing the values of the source IP address fields and/or other fields of the incoming packets to corresponding field values of the probe packet), and increment a per-interface counter responsive to the values matching. If the counters do not increment, it can be assumed that either the external network dropped the packet or the probe packet traveled via a longer, undesirable path. Due to the low TTL value, the probe packet itself expires after several hops; accordingly, any users operating on the IP address being tested do not receive the probe packets. Any Internet Control Message Protocol (ICMP) "TTL Exceeded" messages generated can be transmitted to a monitoring server computer.

For large source networks, one challenge is the sheer number of external BGP sessions and IP prefix announcements across the network perimeter. For example, there can be several thousand unique eBGP sessions (for IPv4 and IPv6) established at the edge of a source network, which can lead to false positives due to packet looping when running concurrent eBGP sessions. One way to address this issue is to make available a pool of individual IP addresses (or a range of port numbers, if a TCP- or UDP-based probe packet is used), which can serve as the source addresses for the probe packets. This can enable the ingress ACL to match and count against a specific set of values that would not be used at the same time.

The probe packets can be generated at an edge router of the source network, or at another network device within the source network. In one example, the probe packets are generated at a different network device than the edge router and then encapsulated ("tunneled") to the edge router. By tunneling a probe packet from a network device to the edge router, IP lookup on all intermediate devices between the network device and the edge router, as well as on the edge router itself, can be bypassed. This can allow for authorized sources within the source network to directly target a specific external network to forward traffic towards. For Internet monitoring applications, like Apogee®, this can make it possible to explore paths well beyond the traditional BGP best path within a network. Accordingly, by using the tunneling approach in conjunction with ingress ACL monitoring, external networks can be probed in order to determine whether they are accepting routing announcements.

In an example where the probe packets are generated at the edge router, the edge router can include a software agent configured to generate the probe packets. The software agent can be configured to communicate with a centralized location within the source network to extract information on which network prefixes to test across external networks, examine existing routing announcements towards external networks, and generate an alert if an announced network prefix is failing to be accepted externally.

In one embodiment, an edge router of a source network includes a set of VRF tables, one for each adjacent external network. Each VRF table includes a default route pointing towards the associated adjacent external network, as well as a loopback interface from which the probe packets are sourced. Ping commands can be executed within the applicable routing-instance towards a destination address in a network address range associated with a previously-announced network prefix under test, sourced from the loopback interface to the destination address with a low TTL value. The ingress ACL on the applicable external adjacency/interface under test can then indicate whether the traffic has returned via the expected path.

In all of the above examples, the network prefix announcements to be tested can be determined before corresponding probe packets can be generated. However, generally an authoritative source for this information is not available, other than directly interrogating network devices of the source network (e.g., edge routers) and examining what is being announced over eBGP sessions. For example, for a given eBGP session, it may be possible to estimate which prefixes are being announced to an external network based upon the routing policies that are deployed on that eBGP session; however, this requires ingesting a routing table feed from the edge router and comparing that to the routing policies on a per-BGP-peer basis. To overcome such issues, one method for determining which network prefix announcements to test includes directly interrogating every eBGP session to determine a list of advertised network prefixes. Then, for a given eBGP session, and for a given network prefix announcement within the eBGP session, a probe packet can be deployed to a single network address in an address range associated with the announced network prefix. This technique can be referred to as continuous prefix validation. In other examples, continuous prefix validation can include relying on an internal system of the source network, the internal system being is configured to serve as an authority on which network prefixes are being announced to any external networks adjacent to the source network.

As an alternative to continuous prefix validation, a technique referred to as triggered prefix validation can be used. In accordance with this technique, the introduction of a new network prefix at a source network can trigger an action to validate that the network prefix is being accepted by external networks. As discussed above, current processes often rely upon examining Internet route-views and Looking Glass sites to identify if a new network prefix is visible on the Internet. One problem with this approach is that it fails to validate all possible paths into the source network, as there may not be vantage points in every external network that is directly connect with the source network. Another challenge is that, depending on where a route originates within the source network, the external networks to which the route advertisement is made can be variable.

For example, a network prefix originating in one network zone of a source network (e.g., a network zone associated with a particular geographic region) can have a specific scope of edge routers and external networks where the network prefix will be announced, which can be very different than the edge routers and external networks where a network prefix originated out of a different network zone of the source network (e.g., a network zone associated with a different geographic region) will be announced. There is no current repository for announced prefixes towards external networks; while some scoping policies are defined within tools such as Geneva Builder, it is often the external routing policy of the edge router that determines if a network prefix should be announced or not. In certain circumstances where there is a limited eBGP announcement scope, operators can integrate these sorts of tests against the applicable edge routers and adjacent external networks. However, such a process can be prone to error, as it relies upon the ability of an operator to fully understand all the networks involved with a network prefix announcement.

One area where a targeted triggered prefix validation is applicable is when turning up any external peering or transit session. As used herein, "turning up" of an external peering or transit session, such as an eBGP session, refers to preparing the network devices being peered for communications with one another. For example, during turning up, eBGP peering or transit sessions are unfiltered and interface utilization is inspected. In this procedure, an operator can trigger prefix validation on the specific sessions involved for all network prefixes that are being announced.

Thus, in accordance with the present disclosure, a source network can validate whether the adjacent external networks are accepting the prefixes that the source network announces. If an external network fails to accept one of the prefixes, this can generate an alert, which in turn can prompt remedial actions such as requesting that the external network update any route filters. In some circumstances, a peer external network may purposely filter routes for maintenance activities or operational reasons (e.g., traffic engineering to avoid congestion or improve performance). For maintenance-related activities, the validation process can examine other factors such as traffic levels and network prefixes received from the external network. In maintenance operations, external networks sometimes withdraw announcements towards a source network as well. Accordingly, it is desirable for a source network to understand its own maintenance and operational practices, to ensure that alerts are not generated due to these situations. This can include examining the traffic shift state on the router, examining the per-peer policy configuration, etc.

FIG. 1 depicts a diagram 100 of an example source network 102 communicatively coupled with an example external network 104. Source network 102 can include a plurality of network zones, and each network zone can be a group of networked computing devices (such as routers) that can be identified as an origin for one or more network prefixes (e.g., IP prefixes, as shown). As an origin for a network prefix, a network zone can be regarded by routers in the network as an ultimate destination for data packets destined for network addresses that begin with the network address prefix. While IP prefixes in particular are described with reference to FIG. 1, other types of network prefixes such as routing masks, subnet masks, etc. can alternatively be used in the same contexts.

Example network zones include separate availability zones, data centers, subnets, BGP autonomous systems, etc. In practice, any group of networked computing devices that can be identified as a destination for a given IP prefix can be a network zone. One or more computing devices in a network zone can generate routing protocol messages that are transmitted through a computer network and/or between computer networks, such as from source network 102 to external network 104.

Source network 102 includes a network zone with a plurality of computing devices 106, which can be client devices associated with users of the source network. In the depicted example, computing devices 106 are destinations for IP addresses in an example IP address range 34.208.0.0/12, which is provided for the sake of example and is not meant to be limiting. Accordingly, each computing device 106 is associated with the IP prefix 34.208. Computing devices 106 can be coupled to a network within a network zone of the source network, such as a CLOS network. For the sake of simplicity, only a portion of the computing devices of source network 102 are depicted; source network 102 can also include additional computing devices in the network zone that includes computing devices 108, and/or additional network zones.

Source network 102 includes an edge router 108, which can be a router configured to provide a point of entry for the source network. Edge router 108 can be configured to route data packets received from computing devices in an external network, such as external network 104, to computing devices within the source network such as computing devices 106. Edge router 108 can also be configured to route data packets received from computing devices internal to the source network to computing devices external to the source network, such as computing devices of external network 104. As discussed further below, edge router 108 can be configured to transmit route advertisement messages (such as BGP update packets, or the like) to external routers, such as to an edge router 110 of external network 104. The route advertisement messages can serve to identify network address prefixes for which edge router 108 can act as a next hop in the routing of data transmissions.

In any of the examples described herein, a network computing device or, more simply, network device is any device that includes input/output ports and is configured to route packets there through. Example network devices include routers, switches, bridges, etc. A router, such as an edge router, can be a computing device configured to receive and forward data packets within a computer network and/or between computer networks. In at least some embodiments, a router can be referred to as a switch. The router can be configured to create and maintain a routing table based on routing protocol messages received via one or more computer networks. The router can comprise multiple communication ports connected to other routers (and/or other types of computing devices). The router can be configured to receive data packets from other routers (and/or other computing devices) via the one or more of the communication ports. The router can use data contained in the data packets and the routing table to identify next hop routers (and/or other computing devices) for the data packets and to transmit the data packets to the identified next hops via one or more of the communication ports.

As discussed further below with reference to FIG. 2, edge router 108 of source network 102 includes a controller and switching logic, and the switching logic includes ACL hardware. The ACL hardware can include an ingress ACL used to detect the return of probe packets used for validation of IP prefix announcements. Optionally, the ACL hardware can also include an egress ACL used for outbound filtering of packets sent by the edge router. Similar to edge router 108, edge router 110 of external network 104 includes a controller and switching logic, and can optionally include ACL hardware (not shown).

Edge routers 108 and 110 can be configured to participate in eBGP peering sessions in which they exchange BGP update packets. One or more network prefixes can be announced via one or more BGP update packets during a single eBGP peering session. For example, during one eBGP peering session, one or more update messages can be transmitted from an edge router of a source network to an edge router of an external network. Each update message can include one or more network prefix announcements. In some examples, the update message announces the network prefix itself (e.g., 34.208). In other examples, the update message announces a range of network addresses (e.g., 34.208.0.0/12) which share a common network prefix (e.g., 34.208).

FIG. 1 shows transmissions of data between the edge routers of the source and external networks that occur over time. The circled numbers 1, 2, and 3 are used to depict stages of a sequence in which the transmissions occur. At stage 1, BGP update packet 112 is transmitted by the controller of edge router 108 to the controller of edge router 110 to provide a routing update to external network 104. In particular, the routing update provided by BGP update packet 112 is an announcement (advertisement) of IP address range 34.208.0.0/12, which includes the IP addresses of computing devices 106. In other words, BGP update packet 112 advertises the IP prefix 34.208. Stage 1 can occur during an eBGP peering session between the source network and the external network, for example. While BGP update packets are described herein, the update packet can alternatively be in another protocol, such as OSPF, IS-IS, protocols developed in the future, etc.

The BGP update packets can include additional data along with the network prefix announcements. For example, a given BGP update packet can include routing information for the network prefixes being announced. Upon receipt of BGP update packet 112, the external network edge router 110 should update its routing tables to include the routing information for the announced IP prefix. However, as discussed above, an external network may not accept an IP prefix announcement and make the corresponding updates to its routing tables within a desired time frame, or at all, for various reasons. Accordingly, at some point in time after the IP prefix announcement is made via the transmission of the BGP update packet to the external network, a validation process is initiated to ensure that the announcement was successful (e.g., to ensure that the advertised routes will be used by the external network when routing data to destination IP addresses in the advertised range). In some examples, the source network is configured to perform the validation process "continuously," such that every BGP peering session is interrogated to identify any IP prefix announcements, and the identification of an IP prefix announcement serves to initiate the validation process for the IP prefix advertised in the announcement. In other examples, the source network is configured to perform "triggered" validation of the IP prefix announcements, in which the validation process is triggered in only certain situations such as during turning-up of a BGP session.

In the depicted example, the source network generates and sends a probe packet 114 towards the external network to determine whether the announced IP prefix has been accepted at the external network. As shown, probe packet 114 includes a Source IP (source address) field having a value of 18.138.0.0, which can be an address within the source network that is dedicated for testing. Probe packet 114 further includes a Destination IP (destination address) field having a value of 34.208.0.0, which is an IP address in the range associated with the IP prefix that was previously announced via BGP update packet 112 at stage 1. While the example address happens to be the first address within that range, any other address within the range can alternatively be used for the announcement. The initial TTL value of probe packet 114 is 2, indicating that the probe packet can make two network hops before it expires. At stage 2, the TTL value of the probe packet is still 2; at this stage, the probe packet has not yet completed any network hops (i.e., it is in the process of making its first hop), and thus the TTL value has not yet been decremented. Probe packet 114 can also include additional fields without departing from the scope of this disclosure. For example, probe packet 114 can also include a protocol field specifying a protocol associated with the probe packet (e.g., Internet Control Message Protocol (ICMP)), a protocol message type field specifying a message type associated with the probe packet (e.g., Echo), etc. Depending on the protocol associated with the probe packet, different fields can be included in the probe packet. For example, probe packets sent via the UDP protocol can include UDP header fields such as a source port field, a destination port field, a checksum field, and a length field. Probe packets sent via the TCP protocol can include TCP header fields such as a source port field, a destination port field, a sequence number field, an acknowledgment number field, a flag field, etc. Probe packets sent via the IP protocol can include a source IP field, a destination IP field, a protocol field, a version information field, a TTL field, etc.

After stage 2, probe packet 114 reaches edge router 110 of external network 104. Edge router 110 will then decrement the TTL value of the probe packet by 1. If the external network has accepted the IP prefix announcement in BGP update packet 112, edge router 110 will route the probe packet to the destination address of the probe packet (i.e., 34.208.0.0). As this is an address within the source network, the next hop of the probe packet will be a hop back to edge router 108. In contrast, if the external network has not accepted the IP prefix announcement in BGP update packet 112, the probe packet will not be routed back to the source network. It will instead expire quickly within the external network (e.g., it will expire after one more hop, as the TTL value is 1).

In the depicted example, the external network has accepted the announcement, and thus probe packet 114 travels back to the edge router of the source network. At stage 3, the probe packet is about to reach an ingress ACL of edge router 108, which is included in switching logic of the edge router. At this stage, it has one hop left (TTL: 1). As discussed further below, the ingress ACL can monitor incoming packets, such as by comparing values of specified fields of the incoming packets to values known to be included in previously deployed probe packets. For example, the ingress ACL of edge router 108 can compare the values of the Source IP field, and optionally values of one or more other fields of probe packet 114, to stored values associated with one or more previously deployed probe packets (including probe packet 114), which will reveal that probe packet 114 has returned. This indicates to the edge router that the IP prefix announcement in BGP update packet 112 was successful, thereby validating that IP prefix announcement. As used herein, validation of an IP prefix announcement can include the edge router transmitting an indication to another computing device, such as a monitoring server of the source network, that the IP prefix announcement was successful. Edge router 108 can also decrement the TTL value of the returned probe packet; in the depicted example, the TTL value is decremented from one to zero after stage 3, and thus the probe packet is not transmitted further into the source network (e.g., it expires before reaching its destination address).

As shown, source network 102 further includes a monitoring server 116. Monitoring server can be a computing device configured to perform functions associated with the deployment of the probe packets, among other functions. For example, monitoring server 116 can track network prefix announcements and supply them to a network device such as the edge router, which in turn can generate probe packets with destination address fields in ranges associated with the announced network prefixes. In other examples, monitoring server 116 can generate the probe packets itself and then transmit them to the edge router for deployment. In addition, monitoring server 116 can keep track of which network prefix announcements are validated (e.g., determined to be successful), and initiate/coordinate remedial actions responsive to any unsuccessful network prefix announcements.

Figure 2:
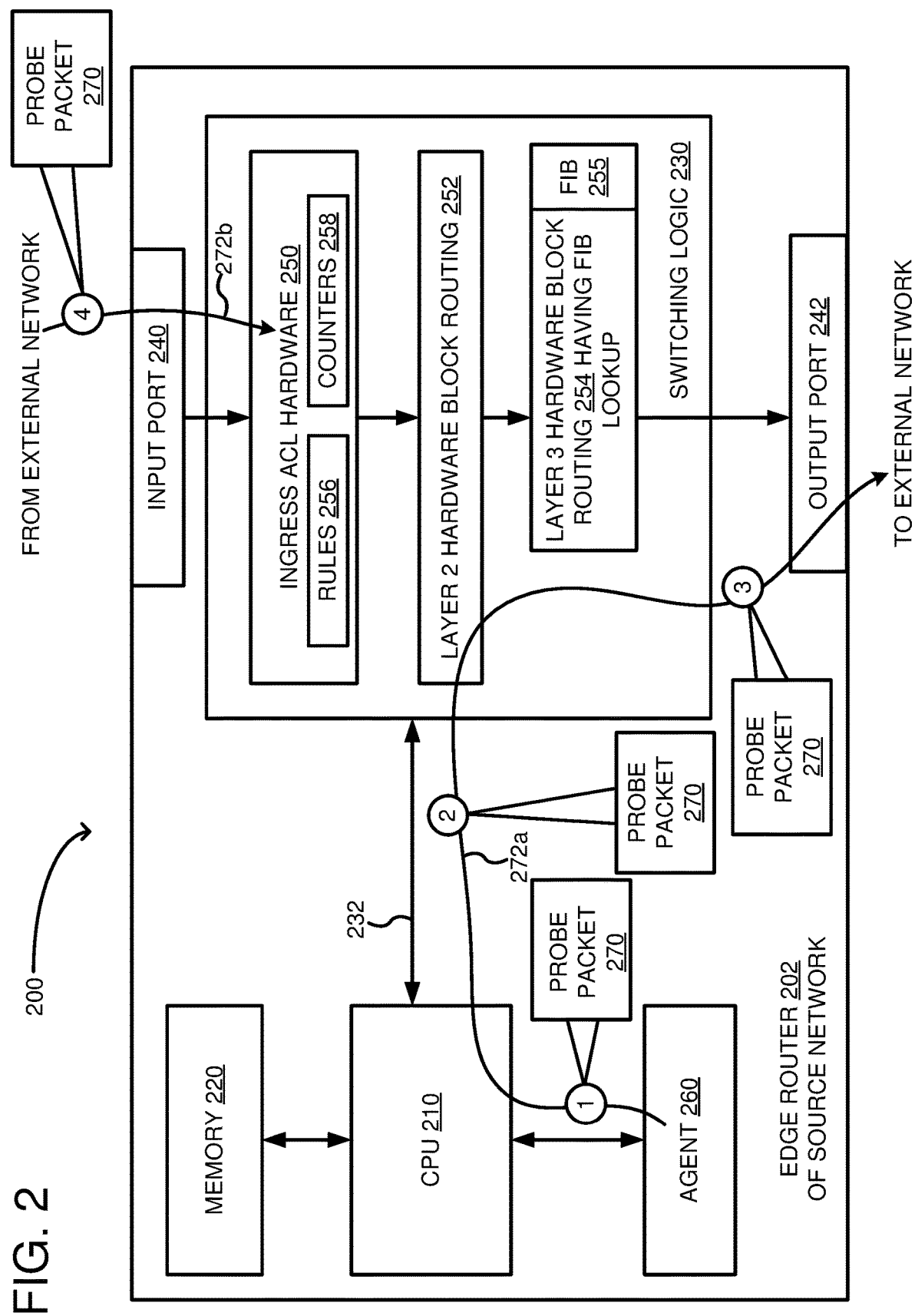
FIG. 2 is a block diagram of an example source network edge router configured to validate announcements of network prefixes.

FIG. 2 shows an example edge router 202, which can correspond to source network edge router 108 of FIG. 1. Edge router 202 is a switch that routes packets to a next hop in the network using a destination address (e.g., a destination IP address). A CPU 210 is coupled to a memory 220 and to switching logic 230 and the hardware logic blocks therein through a bus 232 (PCIe or other protocols and bus types can be used). The switching logic 230 is positioned between an input port 240 and an output port 242, which are typically adapted to receive network cables, such as Ethernet cables. The switching logic 230 can be a single ASIC integrated circuit or divided into multiple integrated circuits.

The switching logic 230 can include multiple different hardware logic blocks including an ingress ACL hardware block 250, a Layer 2 hardware block 252, and a Layer 3 hardware block 254. The Layer 2 hardware block 252 relates to an Ethernet layer and can forward packets based on MAC tables, for example. The Layer 3 hardware block 254 relates to forwarding based on a longest prefix match of an IP address. Layer 3 typically involves a route lookup, decrementing the TTL count, calculating a checksum, and forwarding the frame with the appropriate MAC header to the correct output port. The route lookup of the Layer 3 hardware can include searching within a Forwarding Information Base (FIB) 255, which includes destination addresses for packets being transmitted through the switching logic. To communicate with other Layer 3 switches or routers, edge router 202 can run intra-domain routing protocols, such as Open Shortest Path First (OSPF) or Routing Information Protocol (RIP), or inter-domain routing protocols such as BGP. The routing tables are used to lookup the route for an incoming packet.

The ingress ACL hardware block 250 relates to permissions and can include one or more rules 256 and one or more counters 258. The rules can be used to monitor incoming packets for various reasons, including to detect the return of probe packets used to validate network prefix announcements. As just one example, rules 256 can include a rule to increment one of the counters 258 when an incoming packet has a source address field value that matches the source address field value of a previously deployed (and not yet returned) probe packet. As another example, rules 256 can include more complex rules which increment one of the counters 258 when multiple criteria are met (e.g., when multiple fields of an incoming packet match corresponding fields of a previously deployed probe packet). Rules 256 can also include rules dictating whether to drop a given incoming packet, among other rules.

In some examples, counters 258 are per-interface counters. For example, a given edge router can include a plurality of physical or virtual interfaces at which incoming packets are received. In such examples, each interface can include a corresponding ACL and associated counter. The different hardware blocks of switching logic 230 can be coupled in series, and additional hardware blocks can be added based on the design. Packets pass from the input port 240 to the output port in accordance with the configuration of the hardware logic blocks 250, 252, 254. Although only a single input and output port are shown, usually there are multiple ports on the switch.

As shown, a software agent 260 can execute on the CPU 210. Agent 260 can be used to generate a probe packet 270. The probe packet can then be transmitted to an external network to validate a prior IP prefix announcement. Probe packet 270 can correspond to probe packet 114 and include similar fields, e.g., a source address field, a destination address field, a protocol field, a protocol message type field, etc. In addition, similar to probe packet 114, probe packet 270 can include a TTL value indicating a number of network hops that can be taken by the probe packet before it expires. Generation of the probe packet by agent 260 can include the agent populating the probe packet with values for a plurality of fields and setting the TTL value of the probe packet. The agent can retrieve the values from memory of the edge router, such as memory 220, or from another network device such as monitoring server 116 of FIG. 1. For example, a monitoring server of the source network can track network prefix announcements transmitted to external networks by the source network and transmit the announced network prefixes to agent 260. Agent 260 can then populate the destination address fields of a plurality of probe packets with a values corresponding to the announced network prefixes (e.g., values corresponding to network address ranges associated with the respective announced network prefixes).

Probe packet 270 can be configured such that, despite the destination address being an address within the source network, the probe packet is still transmitted by the edge router to the desired external network. For example, agent 260 can configure the probe packet to include data or metadata that causes the switching logic of the edge router to transmit the probe packet to a specified external network, despite the probe packet being ultimately destined for an address within the source network. In one embodiment, the probe packet includes an indication of a route to be taken to the destination address, in addition to the destination address itself.

Probe packet 270 is transmitted from agent 260 to an adjacent external network via the depicted path 272a. As shown at stage 1, after generating the probe packet, the agent 260 passes (e.g., transmits) the probe packet to the CPU hardware 210. The CPU hardware then transmits the probe packet to the switching logic 230 at stage 2. In particular, the probe packet is injected into an input pipeline of the switching logic (such as via a CPU port of the switching logic), such that it passes through Layer 2 hardware block 252. However, in contrast to normal packet routing through the switching logic, in which a packet is passed from the Layer 2 hardware block to the Layer 3 hardware block, which selects an output port for the packet based on a route specified in the packet (the route including an address in an adjacent external network to serve as the endpoint of a first hop towards the destination address), the depicted probe packet 270 is configured to bypass ("override") the Layer 3 hardware block. As one example, the probe packet can include data in its header that specifies an output port of the edge router to which the probe packet should be transmitted. Accordingly, rather than passing through the Layer 3 hardware block, the probe packet is transmitted from the Layer 2 hardware block directly to an output port of the edge router. Overriding the Layer 3 hardware block can thus enable the probe packet to be transmitted to the external network, despite the fact that the destination network address of the probe packet is an address within the source network. Put another way, by bypassing the Layer 3 hardware block, the probe packet can take an indirect route, through an external network, rather than taking the most direct route to the destination network address.

In some examples, the edge router includes a plurality of output ports (alternatively referred to as egress interfaces), each associated with one or more adjacent external networks; in such examples, the probe packet can be configured to be routed to the output port leading to the external network associated with the network prefix announcement under test (i.e., the external network that received the network prefix announcement to be validated). Further, in some examples, the switching logic can also include one or more egress ACLs, and the probe packet can pass through an egress ACL after passing through the Layer 3 hardware and before being passed to the output port.

After reaching output port 242, probe packet 270 is transmitted to the specified external network. Depending on whether the network prefix announcement being tested by the probe packet was successful, probe packet 270 may or may not return to the source network. In the depicted example, the network prefix announcement being tested by the probe packet was successful, and the probe packet returns to the source network at stage 4 via path 272b. The probe packet is then transmitted from input port 240, at which it was received, to ingress ACL hardware block 250. The rules 256 and counters 258 of the ingress ACL hardware can then be used to detect that the probe packet has returned. For example, as described above, the rules of the ingress ACL hardware can be used to implement a comparison of values of one or more fields of the incoming probe packet to corresponding stored values (which themselves represent the values of the fields of the probe packet), and the values matching can trigger incrementing of one or more of the counters. Incrementing of the counter(s) can in turn trigger an action, such as the edge router sending a message to a monitoring server indicating validation of the network prefix announcement being tested by the probe packet.

The input port 240, output port 242 and switching logic 230 can be considered a data plane of edge router 202. By contrast, the CPU 210, memory 220, and agent 260 can be considered part of a control plane of edge router 202.

Figure 3:
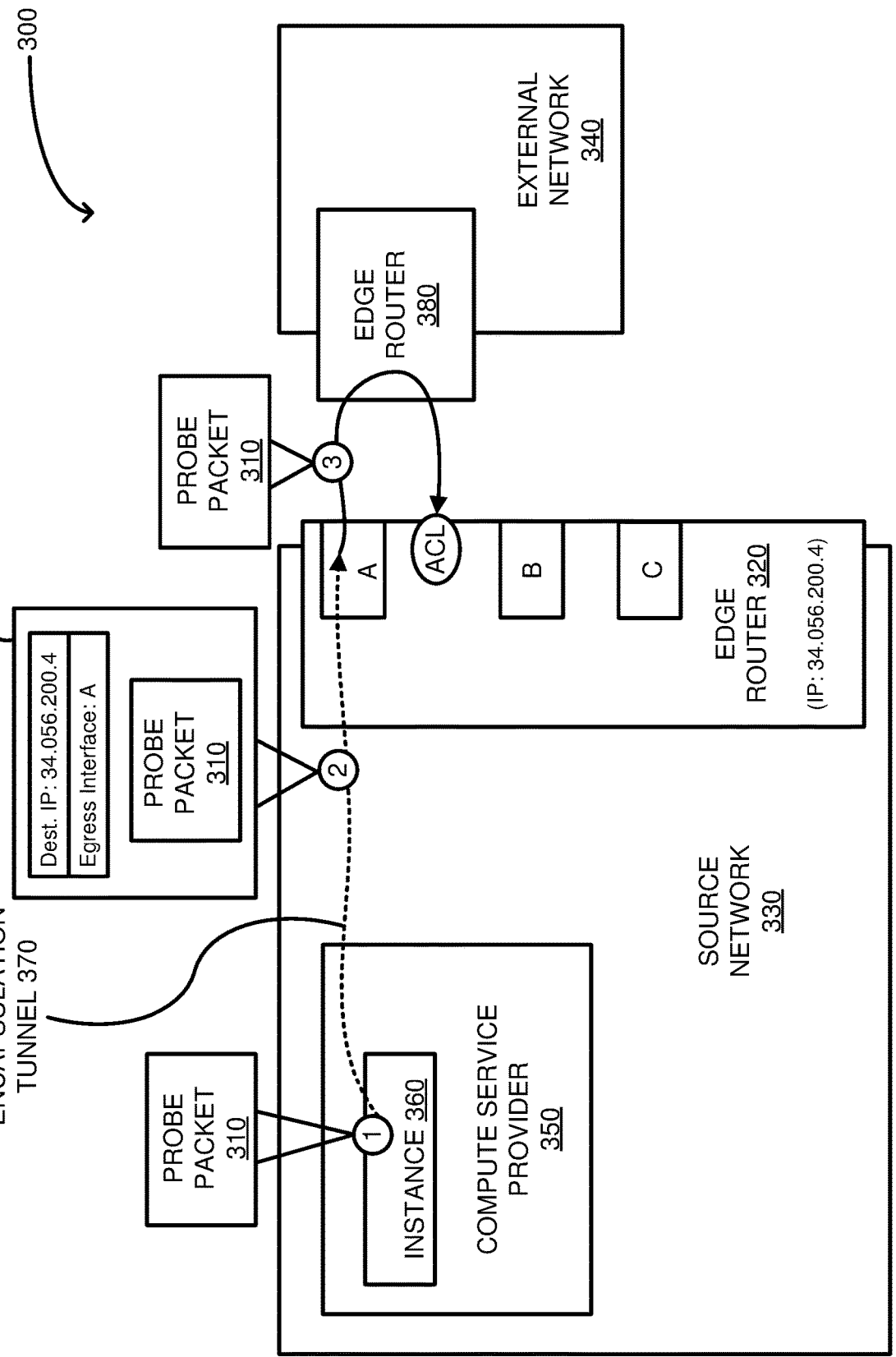
FIG. 3 is a block diagram of an example embodiment in which a probe packet is tunneled to the source network edge router, from elsewhere in the source network, before being sent to the external network to validate an announcement of a network prefix.

FIG. 3 is a diagram 300 of an embodiment in which a probe packet 310 is encapsulated and tunneled to an edge router 320 of a source network 330, from elsewhere in the source network, before being sent to an edge router 380 of an external network 340 to validate an announcement of a network prefix. In the depicted example, probe packet 310 originates within a network-based compute service provider 350, such as a cloud provider. In particular, probe packet 310 originates at a software instance 360, such as a virtual machine, which can be executed on a server computer of the compute service provider. An example compute service provider is discussed in further detail below with respect to FIG. 10. In other examples, however, the probe packet can originate at another location or type of network device within the source network.

To facilitate description, edge router 320 is assigned the IP address 34.056.200.4 in the depicted example; this IP address is provided for the sake of example and is not meant to be limiting. Further, for the sake of example, the depicted edge router 320 includes egress interfaces (e.g., output ports) A, B, and C. Egress interface A is associated with external network 340, such that packets received at egress interface A are routed to external network 340. Similarly, the other egress interfaces can be associated with other external networks, which are not shown. Alternatively, edge router 320 can include a single egress interface, two egress interfaces, or another number of egress interfaces. For example, edge router 320 can include one egress interface for each adjacent (neighboring) external network. However, in other examples, one or more of the egress interfaces can each be associated with multiple external networks.

A sequence of events related to the transmission of probe packet 310 is shown in FIG. 3. At stage 1, probe packet 310 is generated at instance 360, e.g., in the manner described above regarding the generation of probe packet 270 of FIG. 2. After being generated, the probe packet is encapsulated with additional data, for example by adding an encapsulation header to the probe packet or adding data to an existing header of the probe packet. For example, as shown, an encapsulated probe packet 310a includes probe packet 310 along with additional header data (e.g., an encapsulation header). In the depicted example, the additional header data includes a destination IP address 34.056.200.4 (i.e., the example IP address of edge router 320), and identifies egress interface A as the egress interface at the destination IP address to which the probe packet should be routed. Accordingly, encapsulating the probe packet can assist with routing of the probe packet to the appropriate egress interface of the edge router, so that the probe packet is deployed (despite the destination network address of the probe packet itself being an address within the source network). In other examples, different data can be included in the header of the encapsulated probe packet.

At stage 2, encapsulated probe packet 310a is tunneled to edge router 320 via an encapsulation tunnel 370. Upon arrival at the edge router, the encapsulated probe packet can be "de-capsulated" by the edge router (e.g., the edge router can remove the encapsulation header/additional header data) to obtain the original probe packet 310. In contrast to a configuration in which the probe packet is generated at another network device than the edge router and then hops from network device to network device on its way to the edge router, tunneling of the probe packet to the edge router can involve bypassing IP lookup on all intermediate devices between the network device originating the probe packet and the edge router, as well as bypassing IP lookup on the edge router itself. At stage 3, probe packet 310 hops from edge router 310 to edge router 380 of external network 340. In the depicted example, the network prefix announcement was successful, and thus the edge router of the external network transmits the probe packet back to the source network (in particular, to an ingress ACL of edge router 320), towards the destination network address indicated in the probe packet. As discussed above, the TTL value of the probe packet can be set to a relatively low value such that the probe packet expires before actually reaching the destination network address. Upon detecting the return of probe packet 310 (e.g., via the ingress ACL), the source network can validate the associated network prefix announcement.

Figure 4:
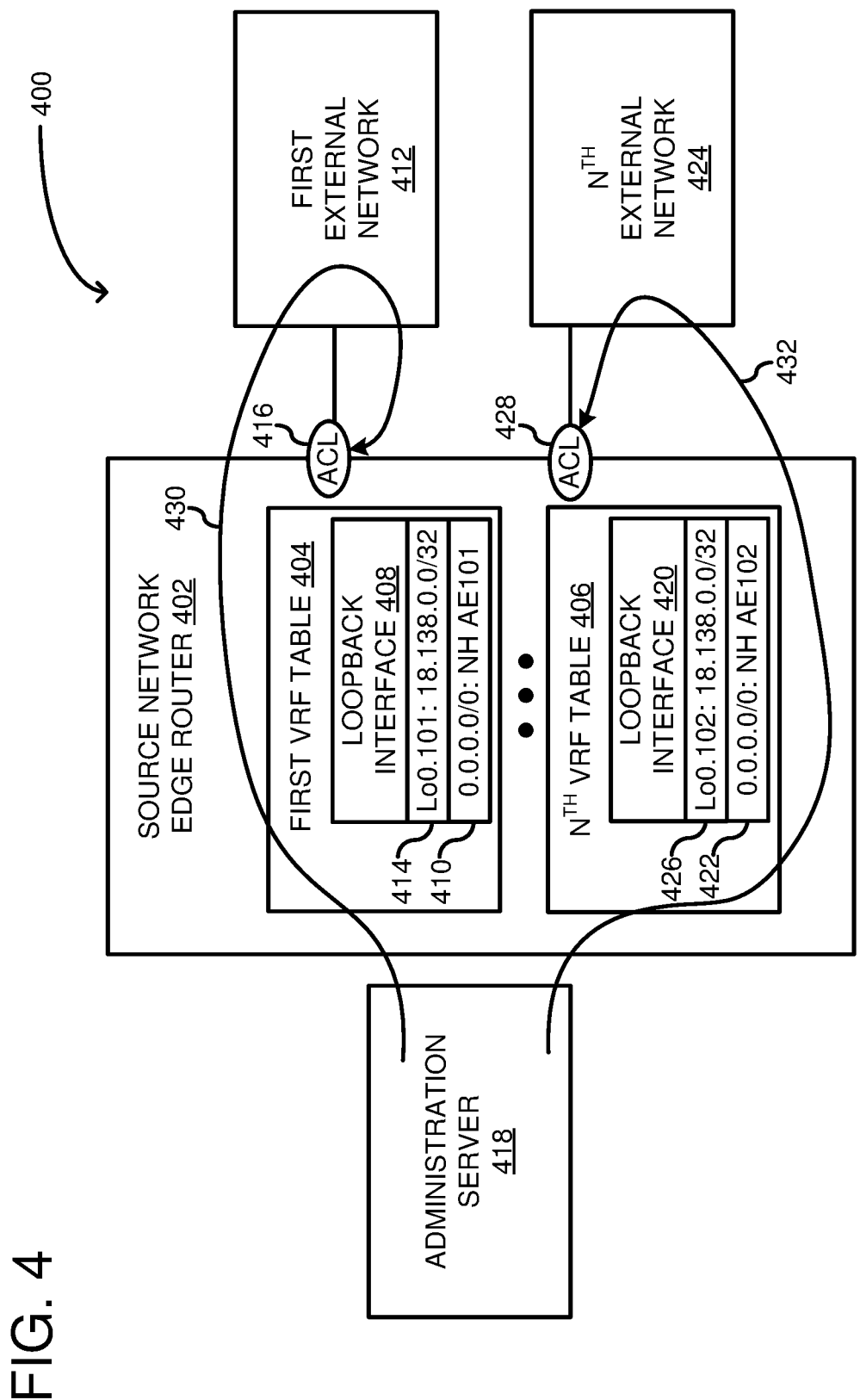
FIG. 4 is a block diagram of an example embodiment in which a source network edge router validates announcements of network prefixes using virtual routing and forwarding (VRF) tables.

FIG. 4 is a diagram 400 of an embodiment in which a source network edge router validates announcements of network prefixes using virtual routing and forwarding (VRF) tables. As discussed above, an edge router of a source network can include a set of VRF tables, one for each adjacent external network. In the depicted example, a source network edge router 402 includes a plurality of VRF tables (i.e., some number N of VRF tables, including at least a first VRF table 404 and an $N^{th}$ VRF table 406). In other examples, the edge router can include a single VRF table. First VRF table 404 includes a loopback interface 408, from which the probe packets are sourced, and a default route 410 pointing towards the associated adjacent external network (in particular, first external network 412). In some examples, the probe packets are implemented by ping commands executed towards a destination address 414 in a network address range associated with a previously-announced network prefix under test, sourced from the loopback interface to the destination address with a low TTL value. An ingress ACL 416, which can correspond to ingress ACL hardware block 250 of FIG. 2, can be used to indicate whether the probe packets have returned via the expected path. As shown, an administration server 418 can be a computing device used to deploy the probe packets. In some examples, the administration server includes a command line interface (CLI) which can be used by a user, such as an administrator of the source network, to deploy the probe packets manually. After being deployed by the administration server, the probe packets/ping commands can be transmitted along a path 430 from the edge router to the first external network 412, and then back to ingress ACL 416.

Similarly, $N^{th}$ VRF table 406 includes a loopback interface 420, from which the probe packets are sourced, and a default route 422 pointing towards the associated adjacent external network (in particular, $N^{th}$ external network 424). As noted above, the probe packets can include ping commands executed towards a destination address 426 in a network address range associated with a previously-announced network prefix under test, sourced from the loopback interface to the destination address with a low TTL value. An ingress ACL 428, which can correspond to ingress ACL hardware block 250 of FIG. 2, can be used to indicate whether the traffic has returned via the expected path. After being deployed by the administration server, the probe packets/ping commands can be transmitted along a path 432 from the edge router to the $N^{th}$ external network 424, and then back to ingress ACL 428.

Figure 5:
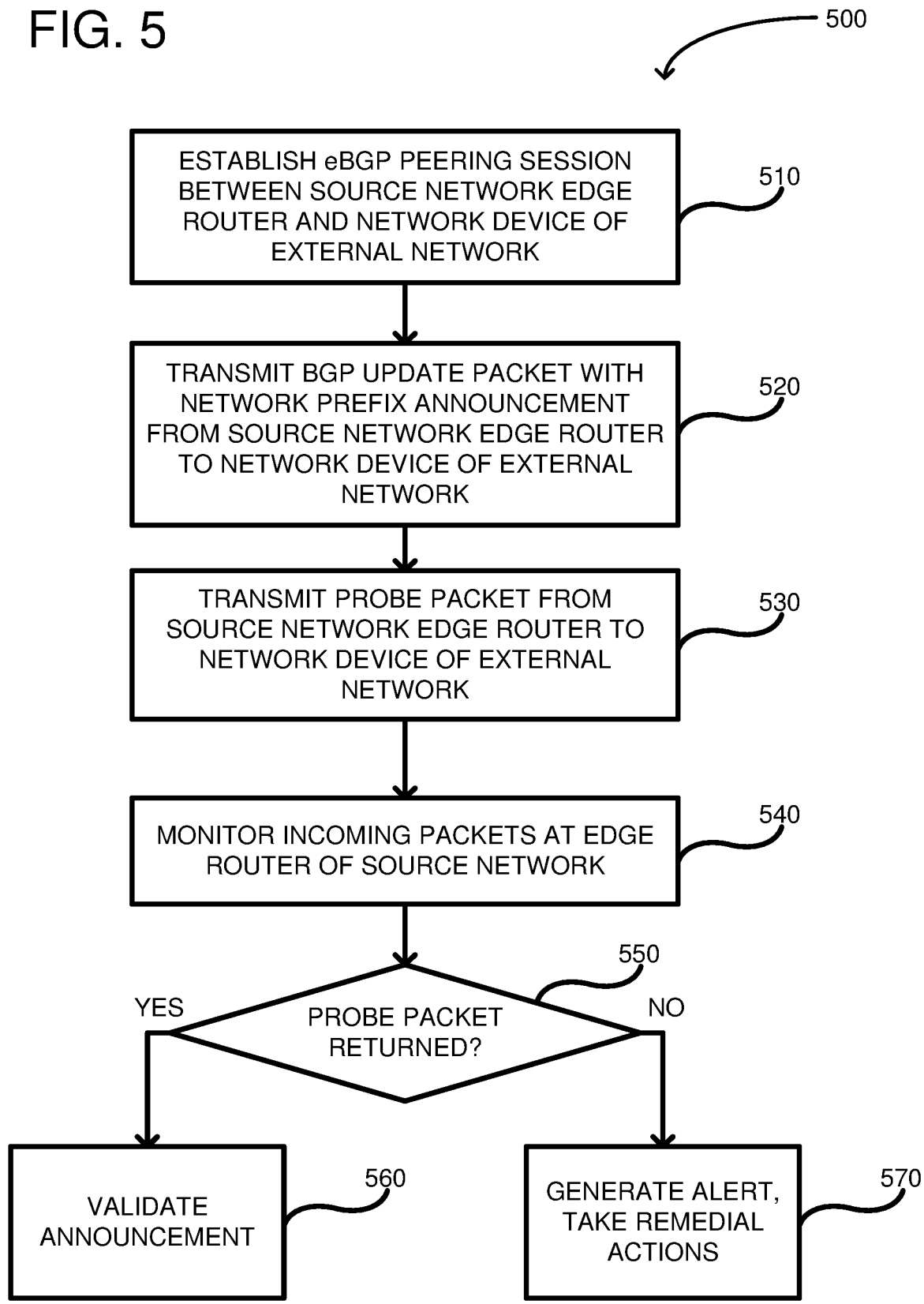
FIG. 5 is a flowchart of an example embodiment for transmitting an update packet with a network prefix announcement from a source network to an external network and deploying a probe packet to the external network to validate the announcement.

FIG. 5 is a flowchart 500 according to one embodiment for transmitting an update packet with a network prefix announcement from a source network to an external network and deploying a probe packet to the external network to validate the announcement. In process block 510, an eBGP peering session is established between an edge router of the source network and a network device of the external network (e.g., an edge router of the external network). In progress block 520, a BGP update packet with a network prefix announcement is transmitted from the source network edge router to the network device of the external network. The BGP update packet can include multiple network prefix announcements, in some examples. Each network prefix announcement can indicate a range of addresses associated with the announced network prefix, e.g., 34.208.0.0/12. In addition, the BGP update packet can include additional information in accordance with the BGP specification.

In process block 530, a probe packet is transmitted from the edge router of the source network to the network device of the external network. As discussed above, the probe packet can be generated at a network device of the source network, such as the edge router, a server computer of a compute service provider, a monitoring server, or another network device. In examples where the probe packet is generated at the edge router, it can be generated by a software agent coupled to a CPU and memory in a control plane of the edge router, as in FIG. 2. In examples where the probe packet is generated at a different network device than the edge router, it can be tunneled (encapsulated) to the edge router, as in FIG. 3.

Figure 6:
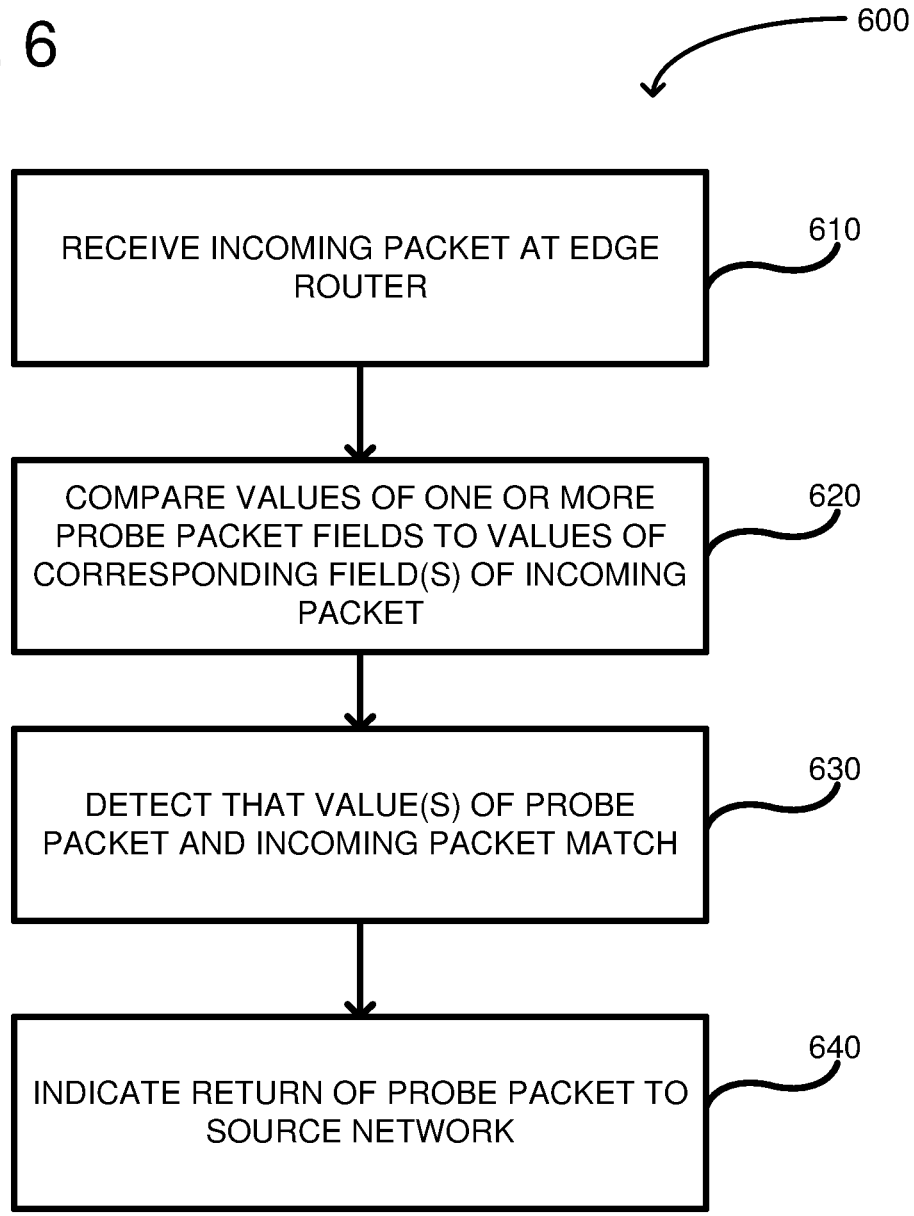
FIG. 6 is a flowchart of an example embodiment for monitoring packets received at a source network edge router to detect the return of a probe packet used for validation of a network prefix announcement.

In process block 540, incoming packets are monitored at the edge router of the source network, e.g., in accordance with the method of FIG. 6. For example, switching logic of the edge router can include ingress ACL hardware configured to monitor incoming packets using rules and counters, as shown in FIG. 2. Based on the rules, field values or other data or metadata of the incoming packets can be compared to corresponding values of the probe packet (e.g., values stored in memory at the edge router or otherwise accessible to the ingress ACL hardware), to detect whether the probe packet has returned to the source network. This can include one or more counters of the ingress ACL hardware being incremented when an incoming packet matches the probe packet in some predetermined way.

In decision block 550, a determination is made as to whether the probe packet has returned to the edge router. In one example, this can include determining whether one or more specified counters of the ingress ACL hardware have incremented. Responsive to a positive determination, the network prefix announcement (i.e., the network prefix announcement made at process block 520) is validated at process block 560 (e.g., confirmed to be successful). Otherwise, responsive to a negative determination, an alert can be generated and/or remedial actions can be taken at process block 570. In particular, the alert can specify that the network prefix announcement made at process block 520 was unsuccessful. The remedial actions can include, for example, initiating re-announcement of the network prefix announcement, transmitting a message to the external network to request that it modify its packet filters, etc.

FIG. 6 is a flowchart 600 according to one embodiment for monitoring packets received at a source network edge router to detect the return of a probe packet used for validation of a network prefix announcement. For example, flowchart 600 can be performed at process block 540 of FIG. 5. In particular, flowchart 600 depicts an example process flow when a probe packet previously deployed by a source network returns to the source network.

In process block 610, an incoming packet is received the edge router. For example, the incoming packet can be received at an interface or port of the edge router, such as input port 240 of FIG. 2. In process block 620, values of one or more fields of a previously-sent probe packet can be compared to values of corresponding fields of the incoming packet which was received at process block 610. In process block 630, it is detected that one or more values of the probe packet and the incoming packet match. At 640, a return of the probe packet to the source network is indicated.

Figure 7:
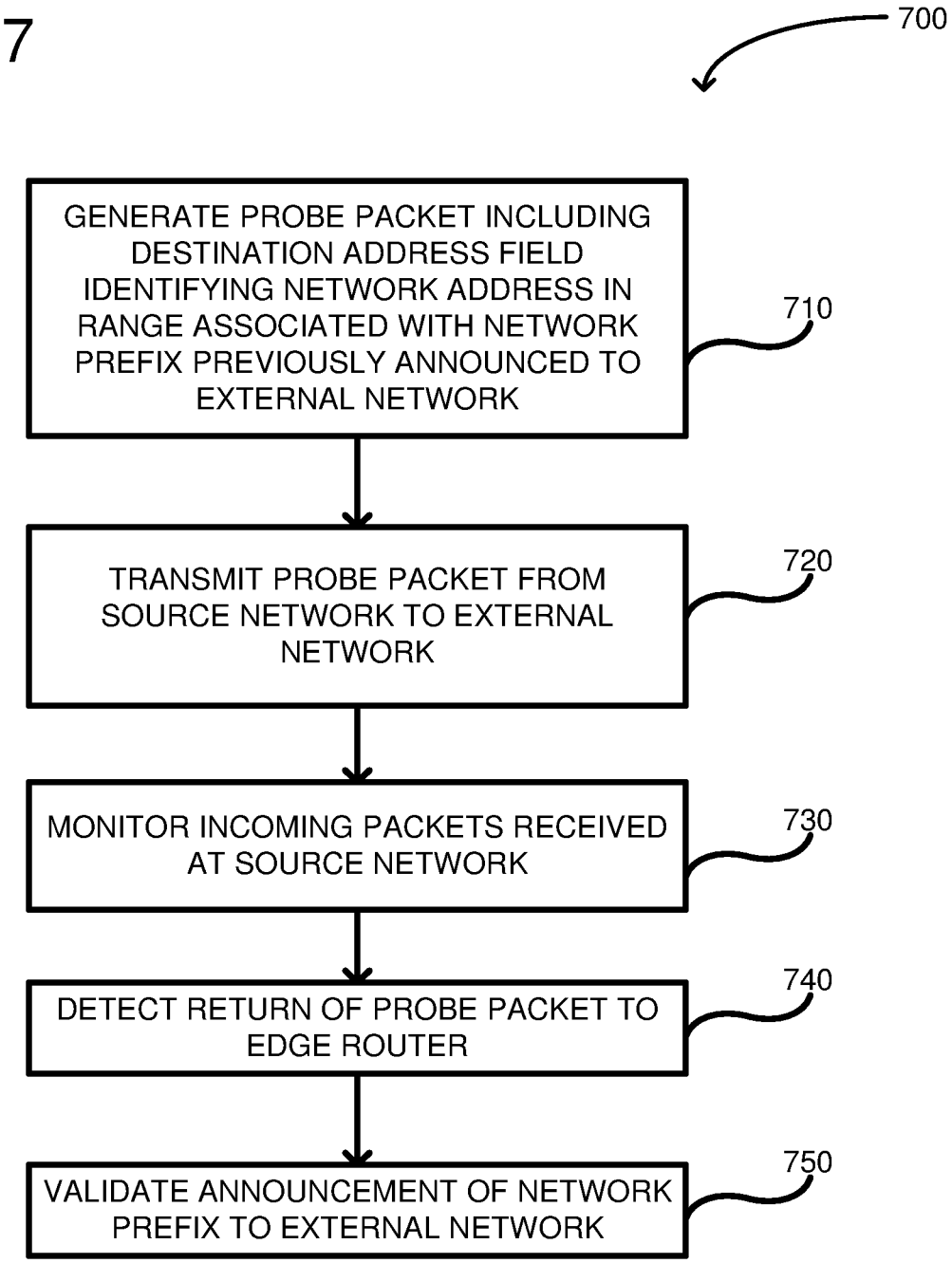
FIG. 7 is a flowchart of an example embodiment for generating a probe packet and using the probe packet to validate a network prefix announcement.

FIG. 7 is a flowchart 700 according to one embodiment for generating a probe packet and using the probe packet to validate a network prefix announcement. For example, prior to being transmitted to the external network in process block 530, the probe packet of flowchart 500 can be generated in accordance with flowchart 700. Similar to flowchart 600, flowchart 700 depicts an example process flow in which the probe packet does return to the source network.

In process block 710, a probe packet is generated, the generated probe packet including a destination address field having a value identifying a network address in a range associated with a network prefix previously announced to an external network. The generation of the probe packet can be performed at the edge router, such as at a software agent executed by a CPU on the edge router. As another example, the probe packet can be generated elsewhere in the source network, e.g., at a monitoring server or a software instance of a compute service provider. As yet another example, the probe packet can be generated external to the source network, e.g., based on data received from the source network, and then transmitted to the source network for deployment. In addition to the destination address field, other fields can be included in the probe packet, such as a source address field, protocol field, protocol message type field, TTL field, etc. In some examples, generation of the probe packet involves populating the probe packet with fields as well as populating the fields with values (e.g., populating the destination address field with a specific destination address value). In other examples, the fields are not populated with values during the probe packet generation stage; instead, this occurs at a later stage, and optionally at another network device or network device component/module.

In process block 720, the probe packet is transmitted form the source network to the external network (i.e., the external network to which the probe packet was previously announced), for example in the manner discussed above with reference to FIG. 2. In process block 730, packets received at the source network are monitored, for example in the manner discussed above with reference to FIGS. 5 and 6. In process block 740, a return of the probe packet to the edge router is detected, for example in the manner discussed above with reference to FIGS. 5 and 6. In process block 750, the network prefix announcement being tested by the probe packet is validated, for example in the manner discussed above with reference to process block 560 of FIG. 5.

Figure 8:
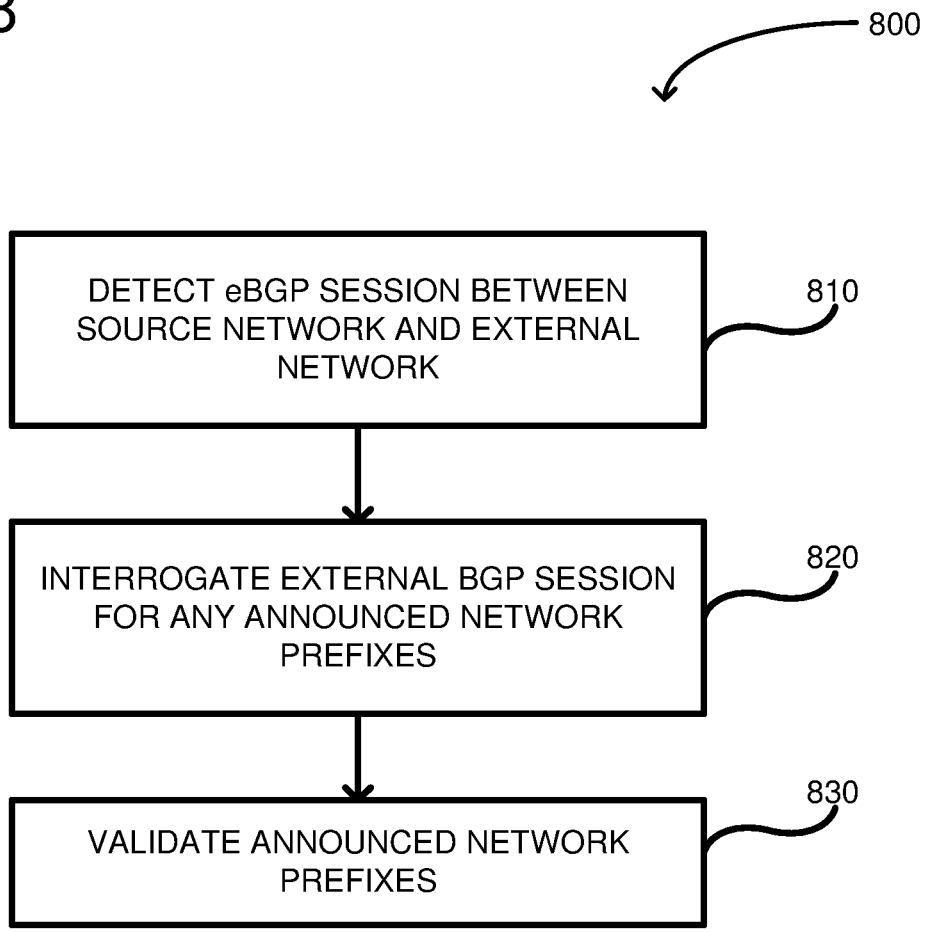
FIG. 8 is a flowchart of an example embodiment for performing continuous validation of network prefix announcements.

FIG. 8 is a flowchart 800 according to one embodiment for performing continuous validation of network prefix announcements. As discussed above, continuous validation of network prefix announcements can refer to techniques involving directly interrogating every eBGP session to determine a list of advertised network prefixes. In process block 810, an eBGP session between a source network and an external network is detected. For example, a monitoring server of the source network, such as monitoring server 116 of FIG. 1, can use polling or interrupts to monitor for eBGP sessions between the source network and external network. In other examples, the edge router participating in the eBGP session itself, or another network device of the source network or of another network can detect the eBGP session.

In process block 820, the eBGP session detected at process block 810 is interrogated for any announced network prefixes. This can include interrogating the eBGP session for any update messages transmitted to the external network participating in the peering session. The interrogation can be performed by the same device that detected the eBGP session (e.g., a monitoring server of the source network), or by another device. In process block 830, any announced network prefixes obtain via the interrogation at process block 820 are validated, for example by deploying corresponding probe packets in accordance with FIGS. 5-7.

Figure 9:
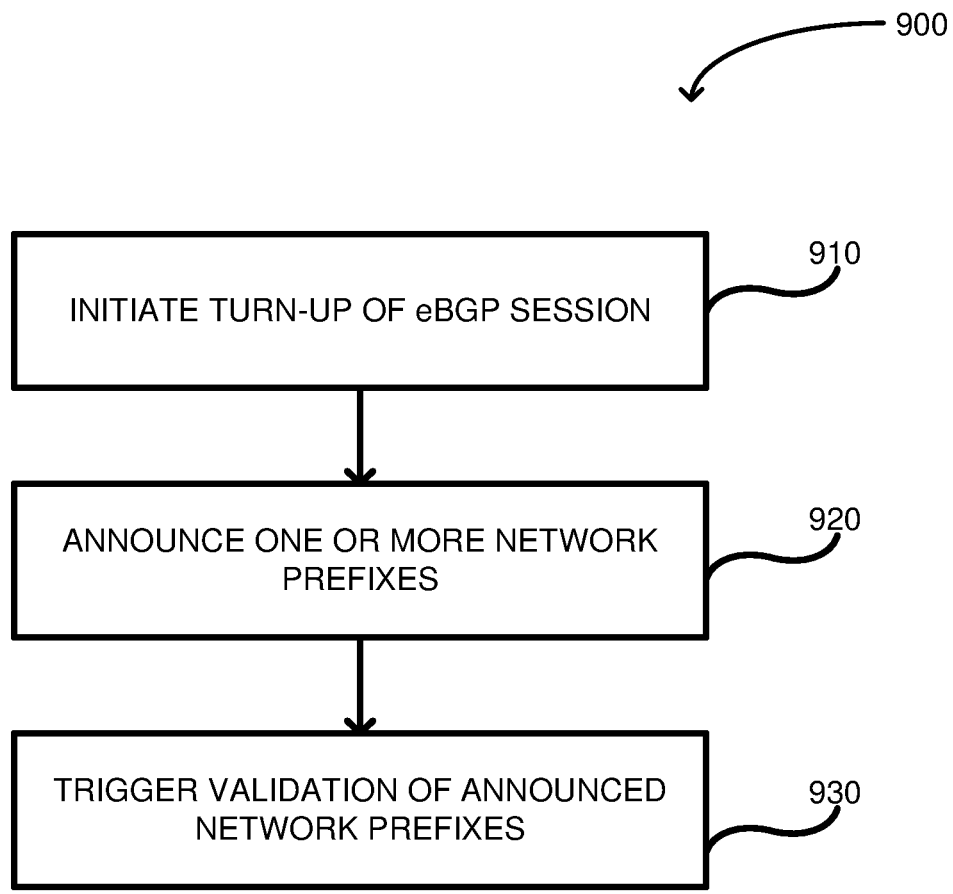
FIG. 9 is a flowchart of an example embodiment for performing triggered validation of network prefix announcements during "turning up" of an eBGP session.

FIG. 9 is a flowchart 900 according to one embodiment for performing triggered validation of network prefix announcements in the context of an eBGP session turn-up event. As discussed above, triggered validation of network prefix announcements can refer to techniques in which the introduction of a new network prefix at a source network can trigger an action to validate that the network prefix is being accepted by external networks. Such techniques can be useful during targeted events such as turning up of an external peering or transit session such as an eBGP session.

In process block 910, turn-up of an eBGP peering session (e.g., between a source network and an external network) is initiated. In process block 920, one or more network prefixes are announced during the eBGP peering session (e.g., network prefixes associated with network addresses of devices recently added to the source network). At process block 930, validation of the network prefixes announced at process block 920 is triggered. For example, a network device overseeing the eBGP peering session, such as a monitoring server, can perform the triggering. The validation can be performed by deploying probe packets to test each of the announced network prefixes, in accordance with FIGS. 5-7.

Figure 10:
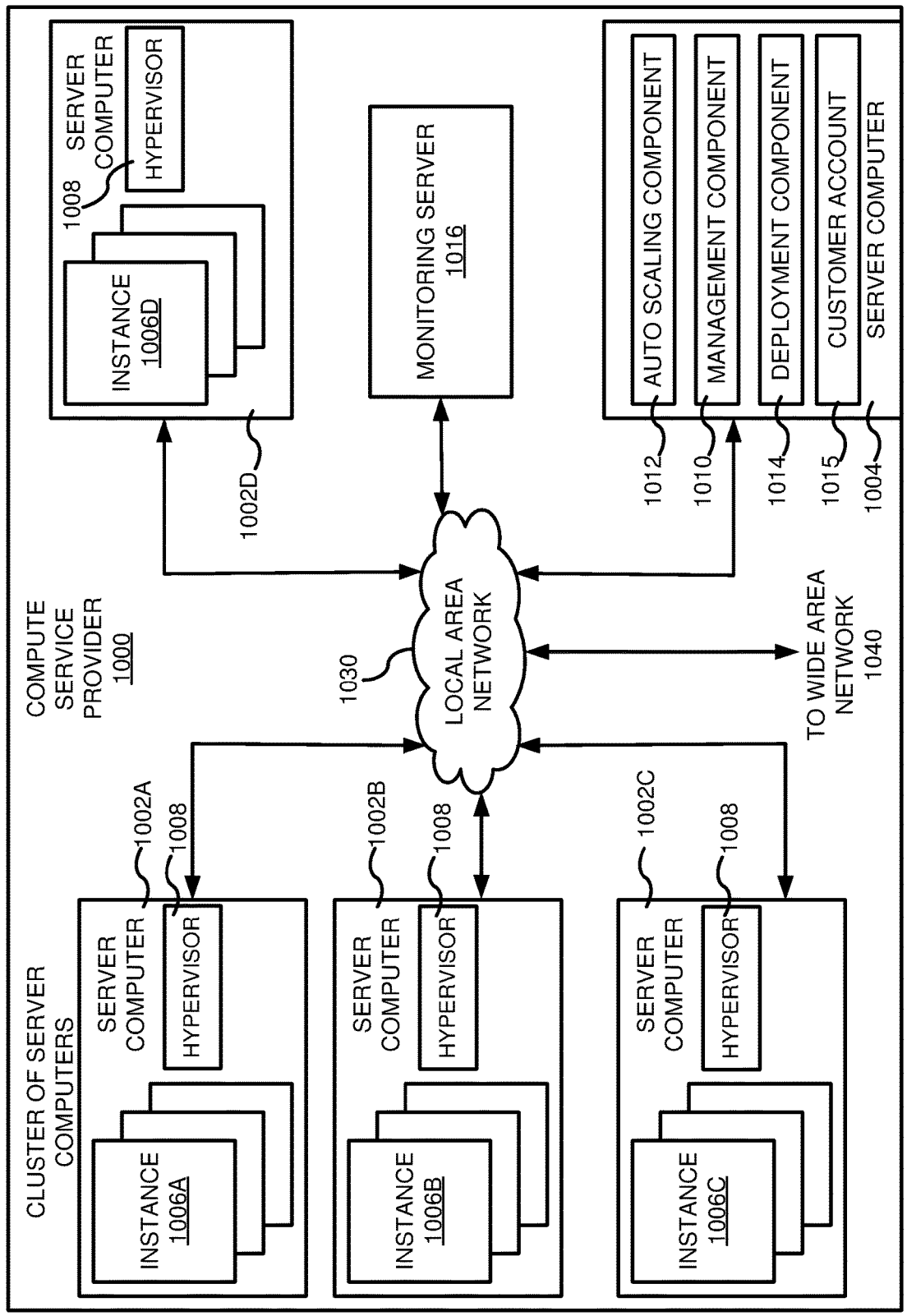
FIG. 10 is an example system diagram showing a plurality of virtual machine instances running in the multi-tenant environment.

FIG. 10 is a computing system diagram of a network-based compute service provider 1000 that illustrates one environment in which embodiments described herein can be used. By way of background, the compute service provider 1000 (i.e., the cloud provider) is capable of delivery of computing and storage capacity as a service to a community of end recipients. In an example embodiment, the compute service provider can be established for an organization by or on behalf of the organization. That is, the compute service provider 1000 may offer a "private cloud environment." In another embodiment, the compute service provider 1000 supports a multi-tenant environment, wherein a plurality of users operate independently (i.e., a public cloud environment). Generally speaking, the compute service provider 1000 can provide the following models: Infrastructure as a Service ("IaaS"), Platform as a Service ("PaaS"), and/or Software as a Service ("SaaS"). Other models can be provided. For the IaaS model, the compute service provider 1000 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 1000 using networked client devices, such as desktop computers, laptops, tablets, smartphones, etc. running web browsers or other lightweight client applications. Those skilled in the art will recognize that the compute service provider 1000 can be described as a "cloud" environment.

The particular illustrated compute service provider 1000 includes a plurality of server computers 1002A-1002D. While only four server computers are shown, any number can be used, and large centers can include thousands of server computers. The server computers 1002A-1002D can provide computing resources for executing software instances 1006A-1006D. In one embodiment, the instances 1006A-1006D are virtual machines. As known in the art, a virtual machine is an instance of a software implementation of a machine (i.e. a computer) that executes applications like a physical machine. In the example of virtual machine, each of the servers 1002A-1002D can be configured to execute a hypervisor 1008 or another type of program configured to enable the execution of multiple instances 1006 on a single server. Additionally, each of the instances 1006 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 10010 can be reserved for executing software components for managing the operation of the server computers 1002 and the instances 1006. For example, the server computer 10010 can execute a management component 1010. A user can access the management component 1010 to configure various aspects of the operation of the instances 1006 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 1012 can scale the instances 1006 based upon rules defined by the user. In one embodiment, the auto scaling component 1012 allows a user to specify scale-up rules for use in determining when new instances should be instantiated and scale-down rules for use in determining when existing instances should be terminated. The auto scaling component 1012 can consist of a number of subcomponents executing on different server computers 1002 or other computing devices. The auto scaling component 1012 can monitor available computing resources over an internal management network and modify resources available based on need.

A deployment component 1014 can be used to assist users in the deployment of new instances 1006 of computing resources. The deployment component can have access to account information associated with the instances, such as who is the owner of the account, credit card information, country of the owner, etc. The deployment component 1014 can receive a configuration from a user that includes data describing how new instances 1006 should be configured. For example, the configuration can specify one or more applications to be installed in new instances 1006, provide scripts and/or other types of code to be executed for configuring new instances 1006, provide cache logic specifying how an application cache should be prepared, and other types of information. The deployment component 1014 can utilize the user-provided configuration and cache logic to configure, prime, and launch new instances 1006. The configuration, cache logic, and other information may be specified by a user using the management component 1010 or by providing this information directly to the deployment component 1014. The instance manager can be considered part of the deployment component.

User account information 1015 can include any desired information associated with a user of the multi-tenant environment. For example, the user account information can include a unique identifier for a user, a user address, billing information, licensing information, customization parameters for launching instances, scheduling information, autoscaling parameters, previous IP addresses used to access the account, etc.

Compute service provider 1000 further includes a monitoring server 1016, which can correspond to monitoring server 116 of FIG. 1. Monitoring server 1016 can be a server computer configured to perform functions associated with the generation, deployment, and tracking of probe packets. Further, monitoring server 1016 can perform functions associated with the announcing of network prefixes to external networks.

A network 1030 can be utilized to interconnect the server computers 1002A-1002D and 1004, as well as monitoring server 1016. The network 1030 can be a local area network (LAN) and can be connected to a Wide Area Network (WAN) 1040 so that end users can access the compute service provider 1000. It should be appreciated that the network topology illustrated in FIG. 10 has been simplified and that many more networks and networking devices can be utilized to interconnect the various computing systems disclosed herein.

Figure 11:
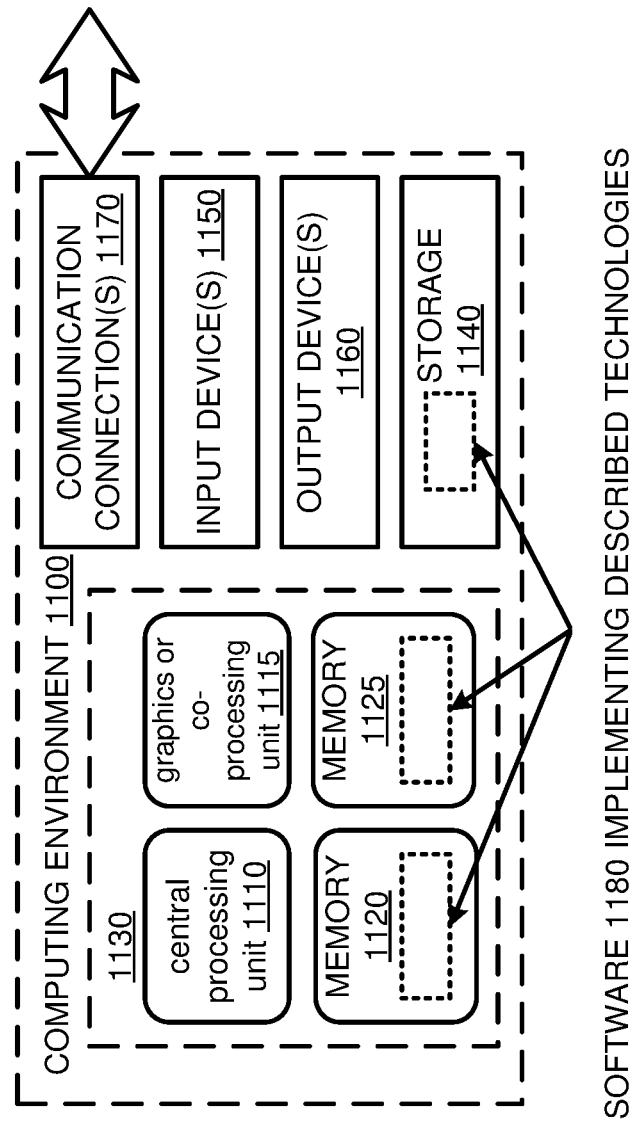
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.). Further, the computing environment can include a computer system comprising multiple computers or processors that execute software in a distributed manner.

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, software 1180 can implement software agent 260 of FIG. 2, among other innovations.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of validating Internet Protocol (IP) prefix announcements, the method comprising:
    establishing a Border Gateway Protocol (BGP) peering session between an edge router of a source network and a network device of a neighboring external network;
    transmitting a BGP update packet from the edge router to the network device, the BGP update packet including an announcement of an IP prefix associated with a range of IP addresses in the source network;
    transmitting a probe packet from the edge router to the network device, the probe packet including a source IP address field, a destination IP address field identifying a destination IP address having the announced IP prefix, and a time-to-live (TTL) field having a value that causes the probe packet to expire before reaching the destination IP address, wherein the destination IP address is within the source network where the edge router is located; and
    monitoring incoming packets received at the edge router to detect whether the probe packet has returned to the edge router, including, for a given incoming packet, comparing a value of a specified field of the probe packet to a value of a corresponding field of the incoming packet and detecting that the probe packet has returned to the edge router if the values match.

2. The method of claim 1, further comprising:
    responsive to detecting that the probe packet has returned to the edge router, validating the announcement of the IP prefix; or
    responsive to failing to detect that the probe packet has returned to the edge router after performing the monitoring for a predetermined time period, indicating that the announcement of the IP prefix failed.

3. The method of claim 1, further comprising taking remedial actions responsive to failing to detect that the probe packet has returned to the edge router after performing the monitoring for a predetermined time period, the remedial actions including: retransmitting the BGP update packet to the network device; transmitting the BGP update packet to a different network device of the external network; or sending a message to a network administrator of the external network.

4. The method of claim 1, wherein the specified field of the probe packet comprises: the source IP address field; the destination IP address field; a protocol field specifying a protocol associated with the probe packet; a protocol message type field specifying a message type associated with the probe packet.

5. The method of claim 1, wherein the IP addresses in the range of IP addresses associated with the announced IP prefix are real IP addresses belonging to a user of the source network.

6. A computer-readable storage medium, which is non-transitory, including instructions that upon execution cause a computer system to:
 at a source network, generate a probe packet including a destination network address field, the destination network address field including a network address in a range associated with a network prefix that was previously announced to an external network;
 transmit the probe packet from the source network to the external network, wherein the destination network address field includes the network address for a destination within the source network; and
 monitor packets received at the source network from the external network to detect whether the probe packet has returned to the source network.

7. The computer-readable storage medium according to claim 6, wherein the instructions, upon execution, further cause the computer system to:
 responsive to detecting that the probe packet has returned to the source network, validating the announcement of the network prefix; or
 responsive to failing to detect that the probe packet has returned to source network after performing the monitoring for a predetermined time period, indicating that the announcement of the network prefix failed.

8. The computer-readable storage medium according to claim 6, wherein the monitoring comprises comparing a specified field of the probe packet to a corresponding field of a packet received at the source network, and detecting that the probe packet has returned to the source network if the fields match.

9. The computer-readable storage medium according to claim 6, wherein the monitoring comprises:
 for each of a plurality of specified fields of the probe packet, comparing the specified field to a corresponding field of a packet received at the source network, and incrementing a value of a counter responsive to the specified field matching the corresponding field; and
 after performing the monitoring for a predetermined time period, detecting whether the probe packet has returned to the source network based on a value of the counter.

10. The computer-readable storage medium of claim 6, wherein the probe packet further includes a time-to-live (TTL) field having a value that causes the probe packet to expire before reaching the network address specified in the destination network address field.

11. The computer-readable storage medium of claim 6, wherein the probe packet further includes a source network address field having a faux value that is different than a source network address of a network device at which the probe packet originated.

12. The computer-readable storage medium of claim 6, wherein the source network is a multi-tenant cloud computing network.

13. The computer-readable storage medium according to claim 6, wherein the probe packet is generated by a first network device of the source network, wherein transmitting the probe packet from the source network to the external network comprises encapsulating the probe packet and tunneling the encapsulated probe packet from the first network device to a second network device of the source network, and wherein causing the probe packet to be sent from the source network to the external network comprises transmitting the probe packet from the second network device to the external network.

14. A network device, comprising:
 a controller configured transmit an update packet from a source network including the network device to a neighboring external network, the update packet announcing a network prefix associated with a range of network addresses in the source network;
 switching logic coupled to the controller, the switching logic including hardware configured to:
  transmit a probe packet from the source network to the external network, the probe packet including a destination network address field identifying a destination network address having the announced network prefix, wherein the destination network address is within the source network from which the probe packet is being transmitted; and
  monitor incoming packets received from the external network to detect whether the probe packet has returned to the network device;
 wherein the controller is further configured to initiate validation of the announcement of the network prefix to the external network responsive to detecting that the probe packet has returned to the network device.

15. The network device of claim 14, wherein the switching logic includes an ingress Access Control List (ACL) hardware block configured to perform the monitoring.

16. The network device of claim 15, wherein the ingress ACL hardware block is configured to increment a counter responsive to detecting receipt of the probe packet.

17. The network device of claim 15, wherein the ingress ACL hardware block comprises a plurality of interfaces and respective counters for the interfaces, and wherein the ingress ACL hardware block is configured to increment the counter for a given interface responsive to a value of a specified field of the probe packet matching a value of a corresponding field of an incoming packet received at that interface.

18. The network device of claim 14, wherein the network device is an edge router, and wherein the probe packet is generated by the edge router.

19. The network device of claim 14, wherein the network device is an edge router, wherein the probe packet is generated by a network device of the source network other than the edge router, and wherein transmitting the probe packet from the source network to the external network comprises tunneling the probe packet from the network device to the edge router and then transmitting the probe packet from the edge router to the external network.

20. The network device of claim 14, wherein the update packet is a Border Gateway Protocol (BGP) update packet sent during a BGP peering session between the network device and a network device of the external network.

* * * * *

UNITED STATES PATENT AND TRADEMARK OFFICE
CERTIFICATE OF CORRECTION

PATENT NO. : 11,115,309 B1
APPLICATION NO. : 16/430291
DATED : September 7, 2021
INVENTOR(S) : Thomas Bradley Scholl It is certified that error appears in the above-identified patent and that said Letters Patent is hereby corrected as shown below:

In the Claims

Column 22,
Line 12, Claim 14 "configured transmit" should be --configured to transmit--

Signed and Sealed this
Fourteenth Day of March, 2023

Katherine Kelly Vidal
Director of the United States Patent and Trademark Office